Oct. 23, 1923.

M. M. DESSAU

FLOATING TOY

Filed April 19, 1923

1,471,885

Inventor
Morland Micholl Dessau
By Julian C. Dowell
his Attorney

Patented Oct. 23, 1923.

1,471,885

UNITED STATES PATENT OFFICE.

MORLAND MICHOLL DESSAU, OF LONDON, ENGLAND.

FLOATING TOY.

Application filed April 19, 1923. Serial No. 633,286.

*To all whom it may concern:*

Be it known that I, MORLAND MICHOLL DESSAU, a citizen of the United States of America, residing at London, England, have invented Improvements in or Relating to Floating Toys, of which the following is a specification.

The object of the present invention is to provide improved aquatic toys and it consists in utilizing crape rubber in conjunction with other kinds of rubber in such a manner as to secure a buoyancy which can be made variable and which will either remain constant or is intended to alter under certain conditions.

According to the simplest form of the invention crape rubber may be cut or stamped to the outline of gold or other fish, the material, which naturally floats, being appropriately coloured as by dyeing and weighted by applying thereto an inconspicuous mass of heavier rubber of a weight and disposition such as to cause the fish representation to preserve a swimming attitude at any chosen depth. As neither of these materials is affected by water the flotation characteristics remain constant.

In some cases however, in lieu of using a combination of these materials alone crape rubber may be fashioned hollow of the shape of a fish, or submarine and the interior more or less filled with spongy or porous rubber. If therefore such a fish or submarine be to a certain extent squeezed to expel air whilst under water, release of the squeezing pressure will cause descent of the toy which may reach the bottom of the water container or may float submerged at a certain depth. If steps be taken to produce air bubbles in the water which can be done in various ways as by allowing water to flow into an aquarium, mechanically agitating the water or blowing air thereinto, it will be found that there is a tendency for such air bubbles to adhere to the toy either temporarily or permanently, hence altering the buoyancy or causing it to rise to the surface.

The toy need not necessarily be in the form of a fish or a submarine but may be in that of any marine, aquatic or amphibious animal, such as a tortoise, or in that of a marine or aquatic plant, or of a diver and so forth.

Figure 1:
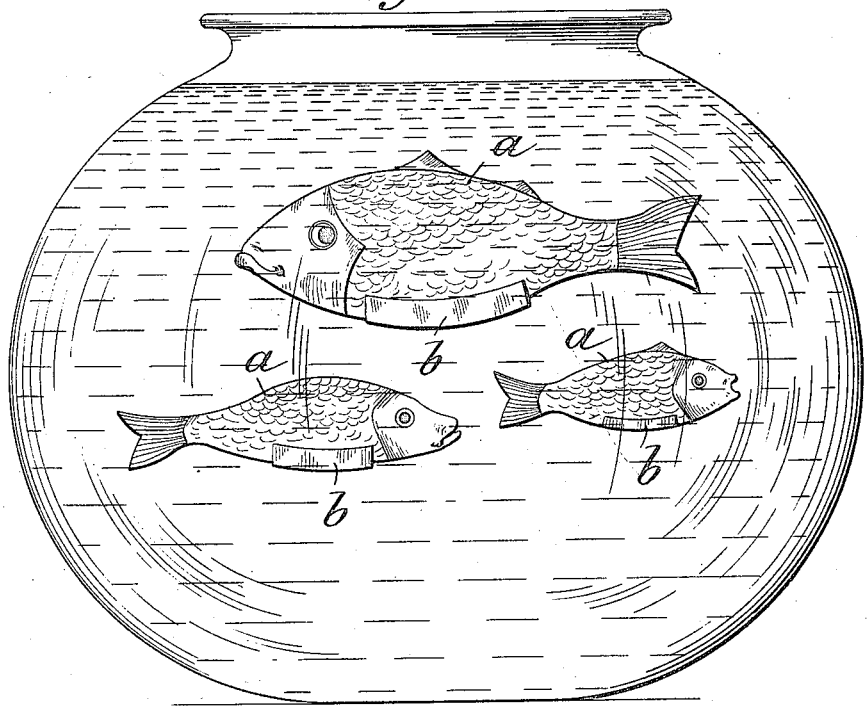
Figure 2:
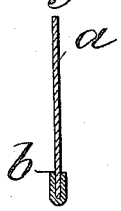
Figure 3:
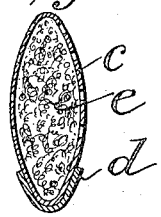
Figure 4:
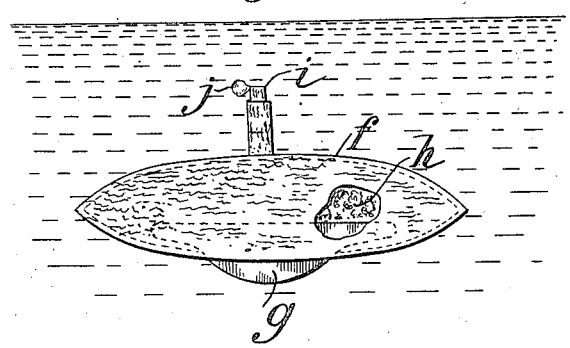

In the accompanying drawings, Fig. 1 represents a bowl of fish embodying the invention. Fig. 2 is a vertical transverse section of one such fish and Fig. 3 is a transverse section of a modified form of body which may be that of a fish or submarine. Fig. 4 is a side view, partly broken away, of a submarine.

In Figs. 1 and 2 *a* is the body of a fish made of crape rubber and *b* is the loading member of heavier rubber which can be cut away to vary the depth at which the fish will remain in water.

In Fig. 3 *c* is an envelope of crape rubber loaded at *d* with heavier rubber and *e* a filling of spongy rubber.

In Fig. 4, *f* is the hull of the submarine, made of crape rubber, *g* the loading member of heavier rubber, and *h* a filling of spongy rubber. *i* represents a periscope to which a bubble *j* can be readily made to adhere.

What I claim is:—

1. An aquatic toy comprising a toy figure having an envelope of crape rubber, a loading member of heavier rubber and a filling of spongy rubber, substantially as described.

2. An aquatic toy consisting of crape rubber and a heavier rubber combined to form a floating toy figure, said figure having a body portion with a vertical axis exceeding its horizontal transverse axis, said body portion being composed of crape rubber and an inconspicuous lower portion composed of heavier rubber, whereby the figure is caused to float in water with the sides thereof arranged vertically.

Signed at London, England, this 23rd day of March, 1923.

MORLAND MICHOLL DESSAU.